July 28, 1959 — A. MAROLA — 2,897,022
MOUNTING FOR ROLLER BEARINGS
Filed Sept. 5, 1957 — 2 Sheets-Sheet 1
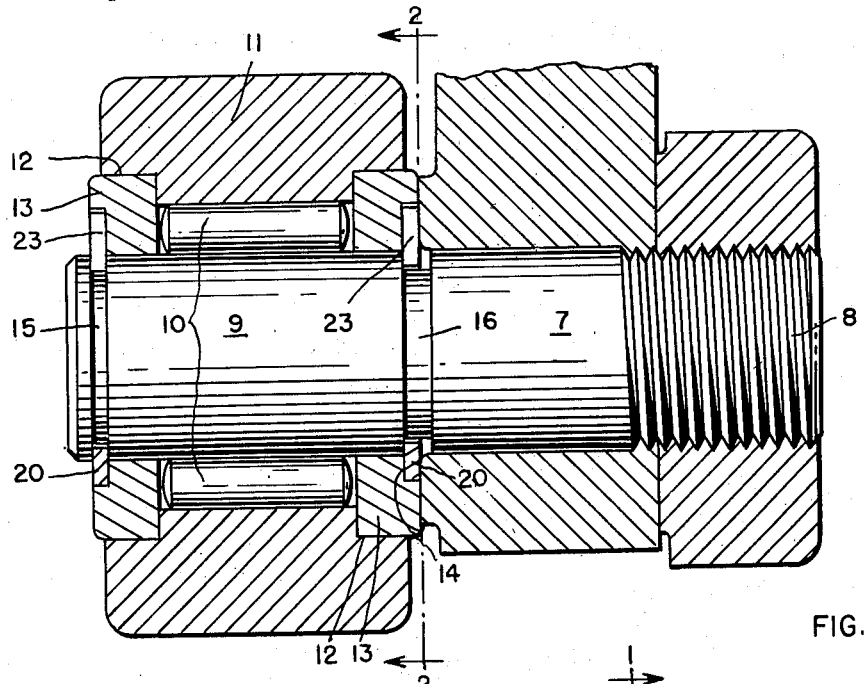
FIG. 1.
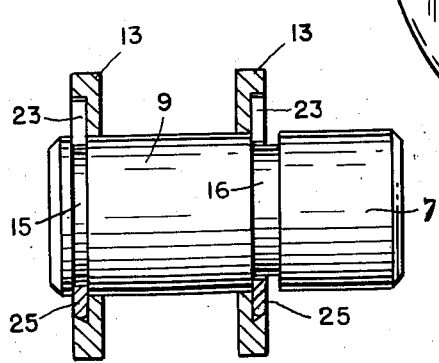
FIG. 6.
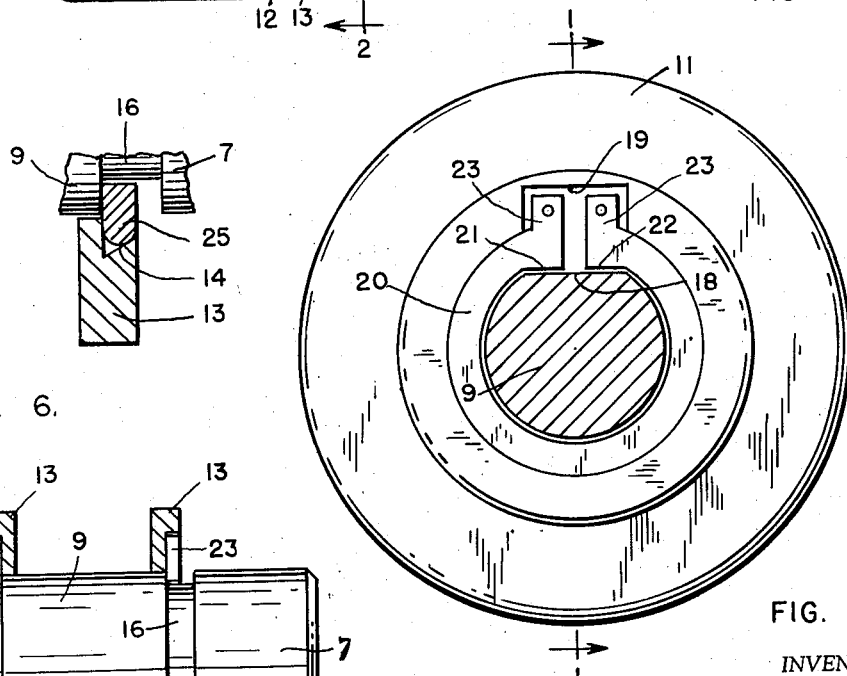
FIG. 2.
FIG. 5.
INVENTOR
A. MAROLA
BY Mason, Porter, Miller & Stewart
ATTORNEYS

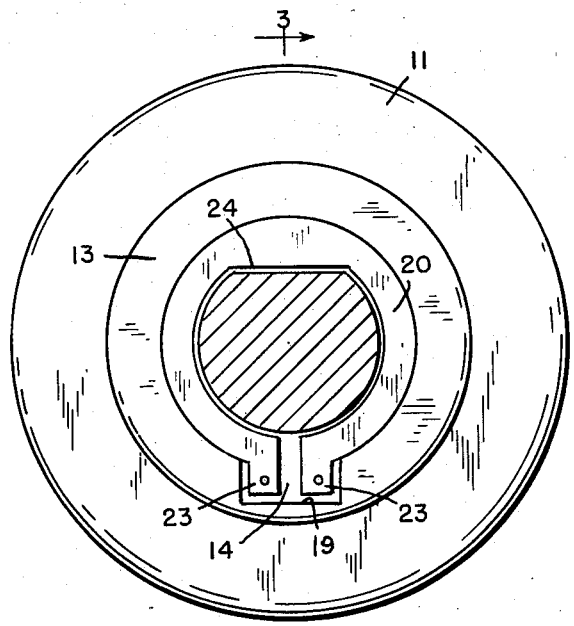
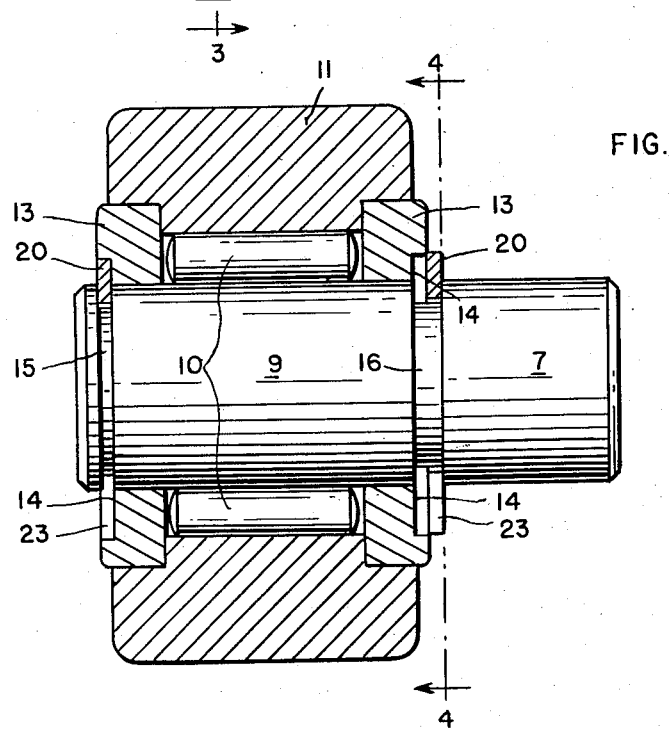

United States Patent Office 2,897,022
Patented July 28, 1959

2,897,022

MOUNTING FOR ROLLER BEARINGS

Americo Marola, Torrington, Conn., assignor to The Torrington Company, Torrington, Conn., a corporation of Maine Application September 5, 1957, Serial No. 682,116

5 Claims. (Cl. 308—208)

The specification which follows relates to improvements in a shaft mounting for a washer which prevents the latter from rotation relative to the shaft. This is adapted for use with needle or roller bearing assemblies such as cam rollers, cam followers, track roller bearings and the like.

There are many devices in the present art to locate relative rotating members axially. Among these are plain snap rings located in a circumferential groove in one member or a loose washer adjacent to shoulders, snap rings, etc. These types of axial locating devices can rotate relative to either the inner or outer member depending on the friction present between surfaces. When relative rotation occurs at external surfaces where lubrication is not present or where the surface area is a minimum, deterioration of these surfaces will occur due to wear.

Rotating load carrying members have parts which rotate relative to each other having a major bearing surface between them in a circumferential plane and adjacent minor bearing axial locating surfaces transverse to this axis. When these bearing surfaces are internal to these parts, lubrication of the rotating contacting surfaces can be usually effected in a practical manner.

The novel washer, snap ring, and snap ring axial groove locating device as described herein fixes the locating surfaces so that relative rotating contact occurs internally to assure lubrication and maximum contact area which results in longer operation of the members.

One application of this device is in the design of cam followers, needle or needle roller bearings which receive a major portion of the load imposed on them in a radial direction and require an axial retainment means to position the inner, outer, and roller members in relation to each other. Henceforth, the description of this device will be related to a cam follower.

An object of this invention is to provide a simple economical needle or roller bearing assembly having substantial load carrying ability, axial rigidity, and long life characteristics utilizing new axial location means having a novel snap ring.

Another object of this invention is to provide an improved axial locating device consisting of snap ring groove, washer, and snap ring which is held from relative rotation with a member to which this device is attached.

These and other objects of the invention will be readily understood from the following description of the preferred form of the invention as illustrated on the accompanying drawings in which:

Fig. 1 is a longitudinal vertical section of the novel washers and associated snap rings as applied non-rotatably to a shaft of a mounted typical roller bearing assembly;

Fig. 2 is a transverse vertical section of the same taken on the line 2—2 of Fig. 1;

Fig. 3 is a longitudinal vertical section of the device during assembly on a shaft;

Fig. 4 is an end elevation partly in section showing a modified form of interfitting;

Fig. 5 is a modified form of interengagement between the washer and the snap ring and Fig. 6 is enlarged view in section of the same.

Generally described, the improved mounting for the roller bearings comprises an inner raceway forming part of the stud shaft itself, the outer raceway or roller carried on the inner raceway by a complement of small diameter rollers where the outer race and complement of rollers are confined at each end by washers which in turn are prevented from axial movement along the shaft by split rings which are snapped into locking position between the washers and the shaft when in its typical mounting. The specific construction of the split rings, washers, and ring groove in the inner raceway is such that relative rotation between the washer and the inner raceway is prevented.

As illustrated on the drawings, a stud shaft 7 is provided. This may have a screw threaded end 8 or some equivalent form of attachment as desired.

The end of the stud shaft 7 forms the inner race 9.

A complement of rollers or the like 10 are provided between the inner raceway 9 and the outer raceway 11. This outer race 11 has a recessed inner edge 12 at each end which receive washers 13. These fit with close clearance within the edges 12 but do not rotate with the outer race 11.

Rotation of the washers 13 is prevented by suitably locking the washers to the inner race 9. This is accomplished by forming a recessed seat 14 Fig. 1 in the outer face of each washer 13. This recessed seat 14 is shaped to receive the split ring 20. The split ring 20 has radial projecting lugs 23, 23 adjacent to the split which, when located in pocket 19 of the washer, prevents the rotation of the split ring 20 in the recessed seat 14.

The cylindrical bore of the split ring 20 is provided with chordal segments 21 and 22 which mate with a flat or removed chordal segment 18 at the bottom of the recessed groove 15 and 16 provided on the inner raceway 9. This mating of the chordal segments 21 and 22 with the flat 18 causes the snap ring to be keyed to the stud shaft 7.

For assembly purposes which will be explained later the groove 16 is of width approximately twice the width of a snap ring 20 on the inner race or shaft 9.

Assembly of the parts is accomplished in the following manner.

The outer washer 13 is slipped over the end of the shaft 9, and the outside snap ring then applied. The outside snap ring is spread apart or expanded and placed in groove 15, Fig. 1. The outside diameter of the snap ring being slightly larger than the recessed bore diameter of 14 is then compressed. The outside washer is engaged with the snap ring aligned in the recess 14 and pocket 19 of the washer. The rollers 10 and outer race 11 are assembled to their respective final positions. The inside washer is inserted into the recess 12 of the outer race 11. The second snap ring is expanded and placed in the inside groove 16 that is shown in Fig. 3. Finally this snap ring aligned with the chordal segments of the snap ring groove is compressed and placed in the inside washer and allowed to expand into engagement with the washer 13 recessed bore 14. The binding between the snap ring 20 outside diameter and the recessed bore allows axial floating in groove 16 of the washer and snap ring without disengaging.

The same effect of locking the washer to the shaft 7 can be obtained by locating a chordal segment in the snap ring at a point other than in the radius of the split in the ring. Thus in Fig. 4 a chordal segment 24 is diametrically spaced from the lugs 23, 23. The engagement with flat 18 and the pocket 19 is the same.

Where the expansion of the outside diameter of the snap ring against the recessed bore of the washer is not great enough to lock the snap ring and washer from disengagement, an alternate method of engagement is shown in Fig. 5. An increase in snap ring washer axial restraint is gained by allowing the recessed bore 14 diameter to increase with the depth of recess. This combines with a snap ring 25 having an outside diameter increasing from a smaller diameter at its faces to a larger diameter at the center of the snap ring. This creates after engagement a greater axial holding force potential due to the development of higher compressive stresses when the snap ring washer disengagement is attempted.

While the preferred form of the invention has been described and illustrated in detail, numerous minor changes in proportions and detail can be followed without departing from the scope of the invention as defined in the following claims.

What I claim is:

1. A cam follower bearing assembly comprising a stud shaft forming an inner raceway for a bearing, an outer race surrounding the shaft, antifriction members between the outer race and shaft, a washer fitted to each end of the outer race, a peripheral groove in the shaft opposite each washer, a resilient split ring carried by each groove and engaging the adjacent washer, said washers each having a recess with a pocket, the adjacent groove of the shaft having a removed chordal segment portion and the associated split ring having a chordal segment portion received in said removed chordal segment portion of the groove and ends located in said pocket.

2. A cam follower bearing assembly comprising a stud shaft forming an inner raceway for a bearing, an outer race surrounding the shaft, antifriction members between the outer race and shaft, a washer fitted to each end of the outer race, a peripheral groove in the shaft opposite each washer, a resilient split ring carried by each groove and engaging the adjacent washer, said washers each having a recess with a pocket, the adjacent groove having a removed chordal segment portion and the associated split ring having two half chordal segment ends received in said removed chordal segment portion of the groove and extending outwardly into said pocket.

3. A cam follower bearing assembly comprising a stud shaft forming an inner raceway for a bearing, an outer race surrounding the shaft, antifriction members between the outer race and shaft, a washer placed at each end of the outer race, each washer having a recessed outer counterbore and a connected pocket, a peripheral groove in the shaft opposite each recessed counterbore having an interrupted portion, a resilient split ring carried by said groove, means on the ring for fastening in the said pocket and other means for engagement with said interrupted portion of the groove.

4. A cam follower bearing assembly comprising a stud shaft forming an inner raceway for a bearing, an outer race surrounding the shaft, antifriction members between the outer race and shaft, a washer fitted to each end of the outer race, a peripheral groove in the shaft opposite each washer, a resilient split ring carried by each peripheral groove and engaging the adjacent washer, each washer having a pocket and a recess increasing in diameter with its depth, the adjacent peripheral groove of the shaft having an interrupted portion and the associated engaged split ring having a portion received in said interrupted portion and ends located in said pocket.

5. A cam follower bearing assembly comprising a stud shaft forming an inner raceway for a bearing, an outer race surrounding the shaft, antifriction members between the outer race and shaft, a washer fitted to each end of the outer race, a peripheral groove in the shaft opposite each washer, a resilient split ring carried by each peripheral groove and engaging the adjacent washer, each washer having a pocket and a recess increasing in diameter with its depth, each peripheral groove having a removed chordal segment portion and each associated split ring having a chordal segment portion received in said removed chordal segment portion of the groove and end lugs located in said pocket.

References Cited in the file of this patent

UNITED STATES PATENTS

| | | |
|---|---|---|
| 882,753 | Grant | Mar. 24, 1908 |
| 1,630,339 | Ganster | May 31, 1927 |
| 2,355,818 | Potter | Aug. 15, 1944 |